United States Patent

Lührig et al.

[11] Patent Number: 6,118,942
[45] Date of Patent: Sep. 12, 2000

[54] PHOTOGRAPHIC FILM PACKAGE WITH LENS

[75] Inventors: Hermann Lührig, Leverkusen; John Sykes, Köln, both of Germany

[73] Assignee: Agfa-Gevaert Naamloze Vennootschap, Belgium

[21] Appl. No.: 09/308,058

[22] PCT Filed: Nov. 27, 1997

[86] PCT No.: PCT/EP97/06606

§ 371 Date: May 12, 1999

§ 102(e) Date: May 12, 1999

[87] PCT Pub. No.: WO98/25177

PCT Pub. Date: Jun. 11, 1998

[30] Foreign Application Priority Data

Dec. 4, 1996 [DE] Germany ............ 196 50 200

[51] Int. Cl.[7] ............ G03B 1/12; G03B 17/02; G03B 17/08
[52] U.S. Cl. ............ 396/6; 396/29; 396/411; 396/412
[58] Field of Search ............ 396/25, 29, 387, 396/411, 412, 6

[56] References Cited

U.S. PATENT DOCUMENTS 5,634,160  5/1997  Lee ............ 396/412 X
5,640,609  6/1997  Reibl et al. ............ 396/29 X

FOREIGN PATENT DOCUMENTS

| 0 679 929 A1 | 11/1995 | European Pat. Off. . |
| 37 35 116 C2 | 4/1988 | Germany . |
| 43 28 926 A1 | 3/1994 | Germany . |
| 295 15 192 U1 | 1/1996 | Germany . |

OTHER PUBLICATIONS

VDI nachrichten, Nr 24, Jun. 14, 1996, S.32.

*Primary Examiner*—Alan A. Mathews
*Attorney, Agent, or Firm*—Connolly, Bove, Lodge & Hutz LLP

[57] ABSTRACT

A photographic film packaging unit (1) which is provided with a lens (2) and which comprises at least one device for making an exposure, and which comprises a light-tight film housing on which the taking lens (2) is mounted, a film cartridge (10) which is enclosed in the light-tight film housing and which contains an empty spool (13), and a rolled up film (12), one end of which is attached to the spool core of the empty spool (13), wherein the film packaging unit (1) contains a motive spring (14) which is tensioned before being put into operation and which acts on the empty film cartridge (10) so that after each exposure the motive spring is released to such an extent that the film (12) is wound into the film cartridge by one frame and the shutter is made ready for release again, is distinguished by its particular convenience of operation.

9 Claims, 3 Drawing Sheets

PHOTOGRAPHIC FILM PACKAGE WITH LENS

This invention relates to a photographic film packaging unit which is provided with a lens, according to the pre-characterising clause of claim 1. The invention thus relates to a camera which cannot be reloaded by the end user.

Photographic film packaging units, so called single use cameras, which are provided with a lens, which are loaded with a film by the manufacturer and which the user hands in for development together with the film, are known from DE 37 35116 for example.

So as to be able to reuse as many parts of the film packaging unit as possible, products have been developed (e.g. according to EP 679 929), in which a core housing comprising all the requisite functions for taking photographs is enclosed by a protective housing, which is formed from two shells for example.

It is thereby ensured that the core housing is protected from moisture, contamination and damage. The protective housing is transparent, at least at the location at which the taking lens is seated in the core housing, or contains a taking lens at the same location.

Film packaging units of said type are inexpensive alternatives to customary photographic cameras which the customer can reload himself. Therefore, film packaging units of said type do not usually comprise an electric motor operated by a battery for advancing the film frame by frame in the film container, but comprise a film advance handle which limits the convenience of operation, and which obviously has to be accessible from the outside and therefore cannot be completely enclosed by the protective housing.

Moreover, the sealing of the location of the protective housing at which the film advance wheel is accessible to the user is problematical, because the film advance wheel has to be movable. The use of a film packaging unit such as this as an underwater camera is therefore associated with considerable cost.

The object of the present invention was to develop a photographic film packaging unit which is provided with a lens, which is convenient to operate and for which the sealing problems are solved.

This object is achieved by providing for the film packaging unit to contain a motive spring which is tensioned before being put into operation and which acts on the empty film cartridge so that after each exposure the motive spring is released to such an extent that the film is wound into the film cartridge by one frame. The spring is preferably designed so that a complete film can be wound frame by frame into the film container without the motive spring having to be tensioned again.

Accordingly, the motive spring is installed in a tensioned state in the film packaging unit before the film packaging unit is closed.

Preferred embodiments of the photographic film packaging unit according to the invention are given in the subsidiary claims.

As mentioned above, the film packaging unit is also suitable as an underwater camera, and is distinguished in particular by an increased level of convenience in operation, since it is not necessary to advance the film manually from photograph to photograph. A further advantage of one preferred embodiment is that a version without a motive spring can be produced using substantially identical components, since in order to advance the film the handwheel can be mounted at the same place where the motive spring is seated in the version with the motive spring.

Moreover, in one preferred embodiment the use of the film packaging unit as an underwater camera is ensured by enclosing the film packaging unit in a water-tight protective housing and by providing for the protective housing to comprise a water-tight, flexible membrane at the location of the shutter release, through which the shutter release button can be operated.

Photographic cameras which are driven by a spring mechanism have already been described, e.g. in D Gbm 1 950 084. The camera which is described there is reloadable. It therefore necessitates a device component which is accessible from the outside and by means of which the spring can be tensioned again, and is subject to the sealing problems described above.

FIG. 1 is a general view of a film packaging unit according to the invention (without the external protective housing);

FIG. 2 is an exploded view showing the most important parts of a film packaging unit according to the invention;

FIG. 3 shows a film packaging unit according to the invention in its "ready for shutter release" state; and FIG. 4 shows a film packaging unit according to the invention with the shutter release pressed down.

FIG. 1 is a perspective illustration of a film packaging unit 1. The reference numerals employed are as follows: 2 denotes the lens, 3 denotes the viewfinder, 4 denotes the spring housing, 5 denotes the cover of the spring housing, 6 denotes the shutter release button and 14 denotes the motive spring for operating the film advance.

Figure 1:
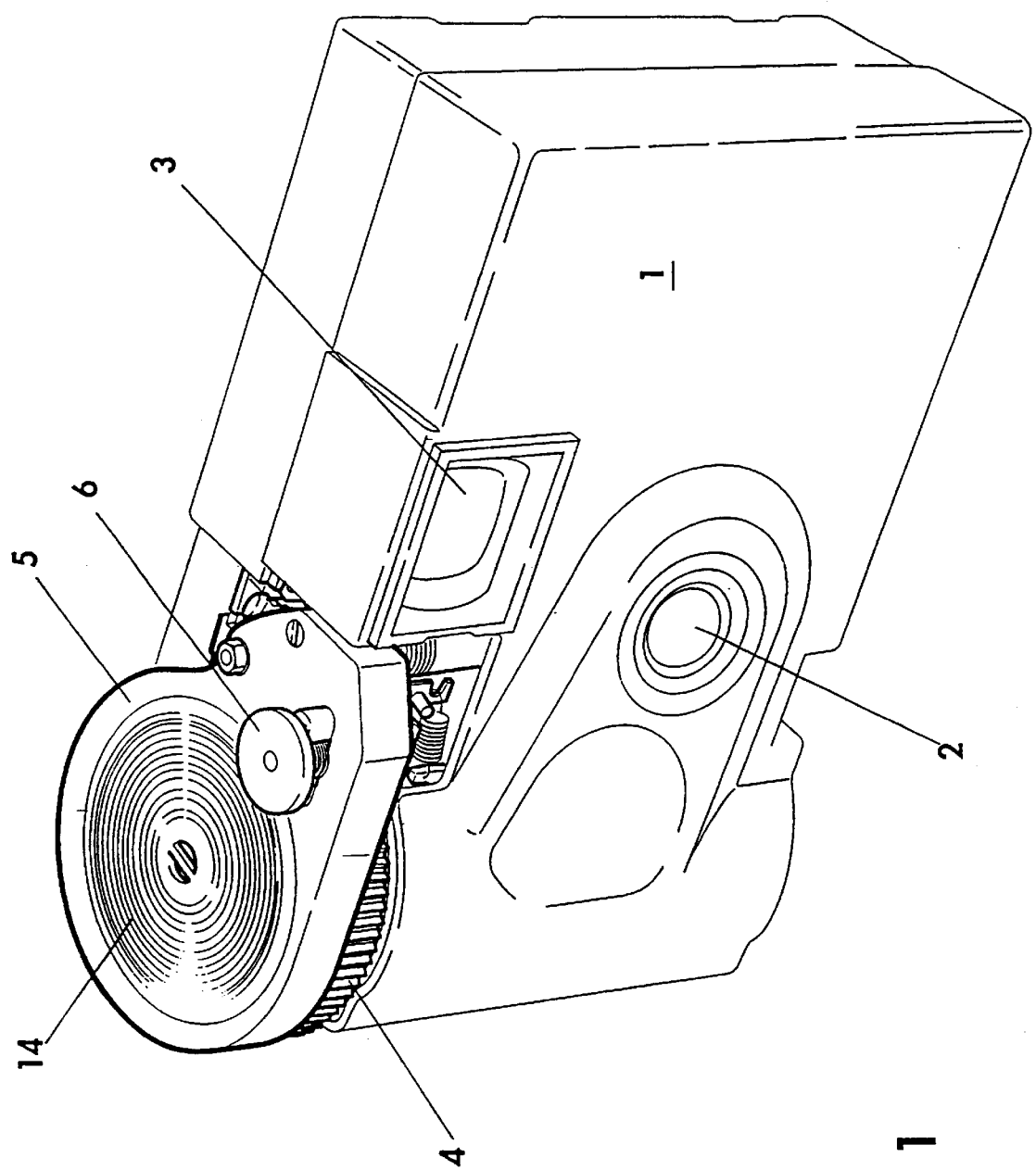
FIGS. 1 to 4 illustrate an embodiment of the film packaging unit according to the invention, where.
Figure 2:
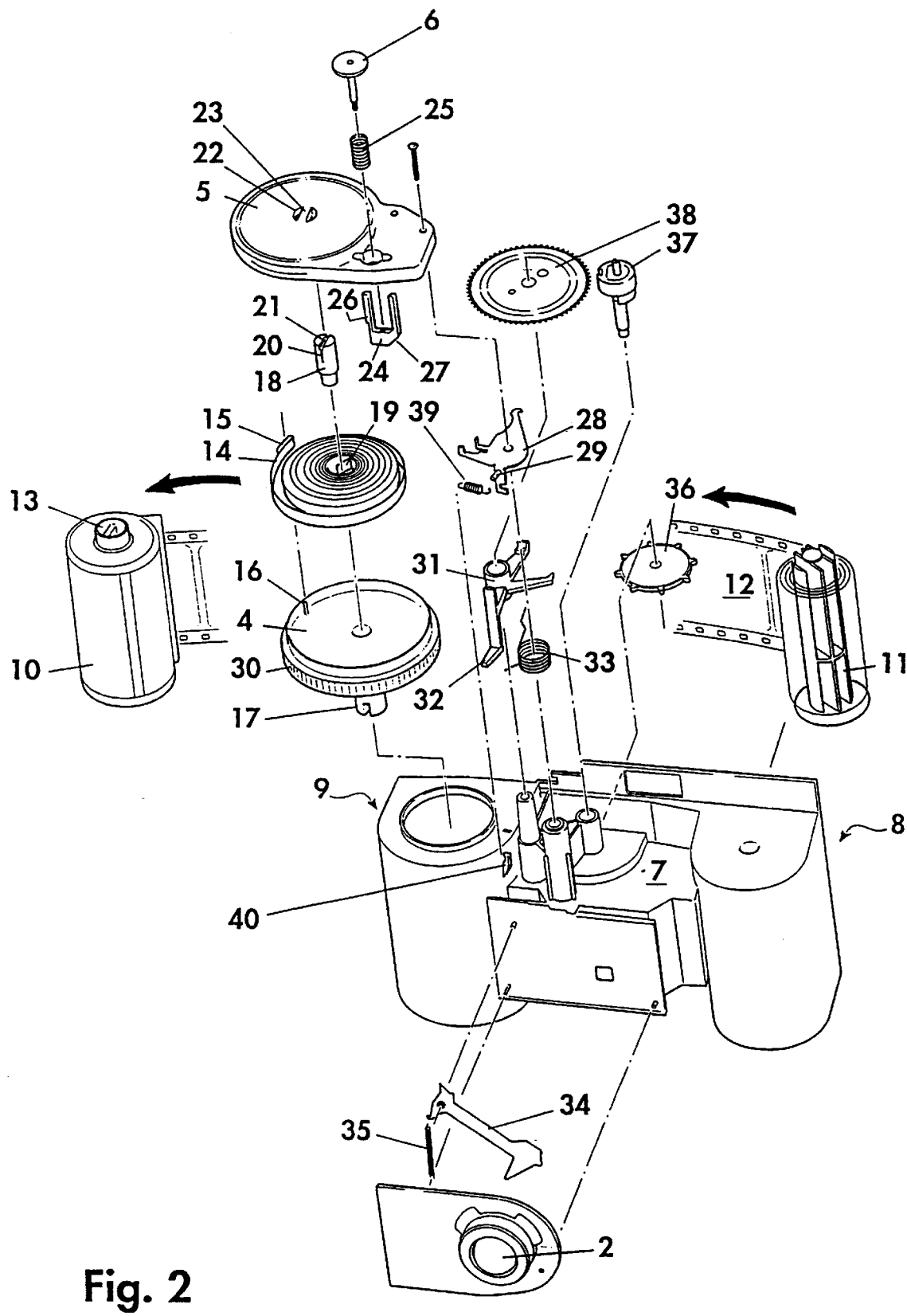
Figure 3:
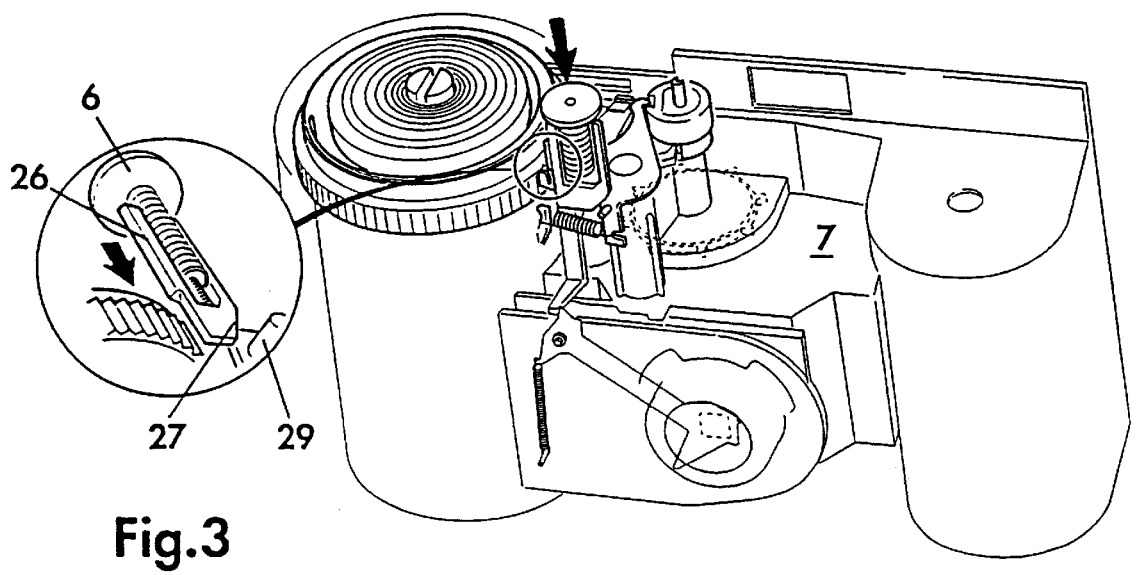
Figure 4:
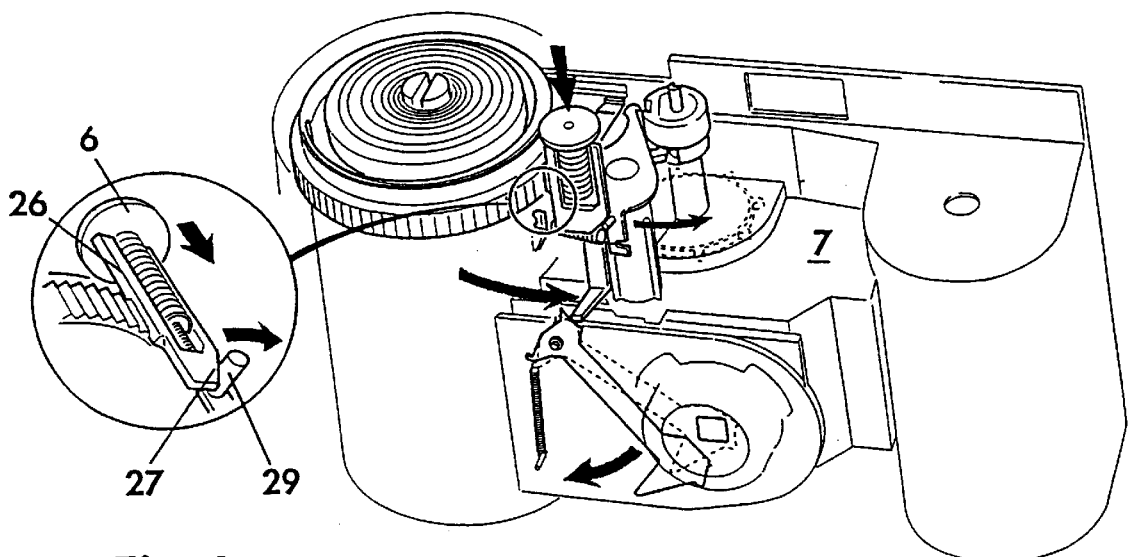

In order to explain the invention, FIG. 2 shows the important parts of a film packaging unit 1 as an exploded drawing. The main body 7 comprises the film supply chamber 8 on the right and the cartridge chamber 9 on the left; the parts which are essential for the exposure and advance of the film are situated therebetween. A wound film 12, which has not yet been exposed, is situated on the film supply spool 11 in the film supply chamber 8. The film is advanced into the film cartridge 10 by turning the spool 13 via the film advance lever, which is not visible. The spool 13 is attached to the spring housing 4 by the key 17. The motive spring 14 is situated in the spring housing 4. The outer end of the motive spring is bent to form a hook and is secured on the pin 16. The pin 18 is rotatably mounted in the centre of the spring housing 4, and comprises a vertical slit 20 into which the inner end 19 of the motive spring 14 is introduced. The pin 18 is provided at its upper end with a horizontal slot 21. The cover 5 has a hole 22 which is coaxial with the spring housing 4 and has a bridge 23 which extends through the centre of the hole 22. In its installed state, the bridge 23 is inserted in the slot 21; the pin 18 is thereby prevented from rotating. Moreover, the shutter release 24 is mounted in the cover 5 so that it can be moved vertically up and down. A downward movement is made by the user pressing the shutter release button 6 with a finger. Upward movement is effected by the return spring 25 when the user has released the shutter release button again. The shutter release 24 comprises the rib 26 on its side facing the spring housing and comprises the bevel 27 on its side facing the pawl 28. When the shutter release button 6 is pressed, the rib 26 comes into engagement with the toothed portion 30 of the spring housing 4 and prevents the spring housing 4 from rotating under the action of the motive spring 14. When the shutter release button is fully depressed, the bevel 27 presses against the peg 29 and swivels the pawl 28 anticlockwise. The striker 31 is thereby released and executes a short anticlockwise swivelling movement under the action of the leg spring 33. During this swivelling movement the finger 32 strikes the shutter blade 34 so that the latter moves out of the light path of the film packaging unit 1 and effects the exposure of the film 12. After about 1/100 seconds the shutter blade 34 is swivelled back into its starting position by the tension spring 35; the exposure process is thus complete. When the user lets go off the release button, the rib 26 comes out of engagement with the toothed portion 30. The spring housing 4 is then rotated anticlockwise under the action of the motive spring 14 and the film 12 is advanced from the supply spool 11 into the film cartridge 10 until the sprocket wheel 36, which is taken with the perforations of the film 12, has executed one revolution. During this revolution of the sprocket wheel 36, the counter disc 38 is also advanced by one frame. The detailed manner in which the sprocket wheel spindle 37, the striker 31 and the pawl 28 cooperate and interrupt the advance of the film 12 after one revolution of the sprocket wheel 36 is familiar to one skilled in the art, and a more detailed description will therefore not be given. Reference is made to FIG. 3 for further clarification. This shows a film packaging unit 1 in its "ready for shutter release" state: the shutter release button 6 is situated in its upper position. FIG. 4 shows the film packaging unit 1 with the shutter release pressed down. In this situation the rib 26 is in engagement with the toothed portion 30, and the shutter blade 34 has exposed the optical light path just for the exposure.

In one preferred embodiment of the invention, the tension spring 39 is provided between a hook 40 on the wall of the cartridge chamber 9 and the pawl 28. This tension spring speeds up the return movement of the pawl 28 and thus increases the reliability of interruption of the film advance after exactly one revolution of the sprocket wheel 36. This is effected even for the first few exposures, when the motive spring 14 is still very highly tensioned and correspondingly exerts a considerable force.

List of reference numerals

| | |
|---|---|
| 1 | film packaging unit |
| 2 | lens |
| 3 | viewfinder |
| 4 | spring housing |
| 5 | cover |
| 6 | shutter release button |
| 7 | main body |
| 8 | film supply chamber |
| 9 | cartridge chamber |
| 10 | film cartridge |
| 11 | film supply spool |
| 12 | film |
| 13 | spool |
| 14 | motive spring |
| 15 | hook |
| 16 | pin |
| 17 | key |
| 18 | pin |
| 19 | inner end |
| 20 | slit |
| 21 | slot |
| 22 | hole |
| 23 | bridge |
| 24 | shutter release |
| 25 | return spring |
| 26 | rib |
| 27 | bevel |
| 28 | pawl |

-continued

List of reference numerals

| | |
|---|---|
| 29 | peg |
| 30 | toothed portion |
| 31 | striker |
| 32 | finger |
| 33 | leg spring |
| 34 | shutter blade |
| 35 | tension spring |
| 36 | sprocket wheel |
| 37 | sprocket wheel spindle |
| 38 | counter disc |
| 39 | tension spring |
| 40 | hook |

What is claimed is:

1. A photographic film packaging unit provided with a lens and which comprises at least one device for making an exposure, and which comprises a light-tight film housing on which the lens is mounted, a film cartridge which is enclosed in the light-tight film housing and which contains an empty spool having a core, and a rolled-up film, one end of which is attached to the core of the empty spool, and wherein the film packaging unit contains a motive spring which is tensioned before being put into operation and which acts on the film cartridge so that after each exposure the motive spring is released to such an extent that the film is wound into the film cartridge by one frame, and wherein the film cartridge is situated in a cartridge chamber, a cylindrical spring housing in which the motive spring is disposed is provided above the cartridge chamber, the spring housing comprises an externally encircling toothed portion connected to the spool of the film cartridge and is mounted so that the toothed portion rotates about a pin disposed in the center of the film cartridge to which pin the inner end of the motive spring is fixed.

2. A film packaging unit according to claim 1, wherein the spring force of the motive spring is sufficient to wind a complete film frame by frame into the film container.

3. A film packaging unit according to claim 1, wherein the motive spring makes the device for making an exposure ready for operation again after each exposure.

4. A film packaging unit according to claim 1, which is surrounded by a protective housing formed from shells, wherein the protective housing is transparent, at least in the region of the lens.

5. A film packaging unit according to claim 4, wherein the protective housing is formed by a substantially rigid plastics material.

6. A film packaging unit according to claim 1, wherein the motive spring acts in such a way that the film is not advanced until a shutter blade, which is opened by actuating a shutter release has returned to its initial position.

7. A film packaging unit according to claim 1 wherein a pawl is provided which engages in the encircling toothed portion of the spring housing and which comes out of engagement during an exposure and comes into engagement again with the encircling toothed portion of the spring housing after the film has been advanced by one frame.

8. A film packaging unit according to claim 7, wherein the pawl and the cartridge chamber are connected to each other by a tension spring.

9. An underwater film packaging unit according to claim 1 for taking underwater photographs.

* * * * *